(12) United States Patent
Hyo

(10) Patent No.: US 11,914,652 B2
(45) Date of Patent: Feb. 27, 2024

(54) INFORMATION PROCESSING SYSTEM, METHOD, AND STORAGE MEDIUM

(71) Applicant: Ricoh Company, Ltd., Tokyo (JP)

(72) Inventor: Kiyohiro Hyo, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/113,692

(22) Filed: Dec. 7, 2020

(65) Prior Publication Data

US 2021/0191984 A1   Jun. 24, 2021

(30) Foreign Application Priority Data

Dec. 19, 2019 (JP) .................................. 2019-229112

(51) Int. Cl.
*G06F 16/00* (2019.01)
*G06F 16/9038* (2019.01)
*G06F 16/958* (2019.01)
*G06F 16/9035* (2019.01)
*G06T 3/00* (2006.01)
*G06F 16/738* (2019.01)

(52) U.S. Cl.
CPC ........ *G06F 16/9038* (2019.01); *G06F 16/739* (2019.01); *G06F 16/9035* (2019.01); *G06F 16/958* (2019.01); *G06T 3/0018* (2013.01)

(58) Field of Classification Search
CPC .................................................... G06F 16/739
See application file for complete search history.

(56) References Cited

U.S. PATENT DOCUMENTS

| | | |
|---|---|---|
| 2005/0084136 A1 | 4/2005 | Xie et al. |
| 2006/0112031 A1 | 5/2006 | Ma et al. |
| 2009/0063612 A1 | 3/2009 | Hyo |
| 2009/0109216 A1* | 4/2009 | Uetabira ............. G06F 16/9577 345/419 |
| 2010/0002254 A1 | 1/2010 | Hyo |
| 2010/0220352 A1 | 9/2010 | Hyo |
| 2011/0067088 A1 | 3/2011 | Hyo |
| 2011/0153653 A1* | 6/2011 | King ................... G06F 16/5846 707/769 |
| 2012/0239830 A1 | 9/2012 | Sugimura et al. |
| 2013/0117473 A1 | 5/2013 | Hyo |
| 2013/0242328 A1 | 9/2013 | Hyo |

(Continued)

FOREIGN PATENT DOCUMENTS

| | | |
|---|---|---|
| JP | 2006-253845 | 9/2006 |
| JP | 2008-033839 | 2/2008 |

(Continued)

OTHER PUBLICATIONS

Extended European Search Report dated May 10, 2021 in European Patent Application No. 20212242.0, 9 pages.

(Continued)

*Primary Examiner* — Ajith Jacob
(74) *Attorney, Agent, or Firm* — XSENSUS LLP

(57) ABSTRACT

An information processing system includes circuitry configured to acquire browsing information indicating a display state of an image from a browsing terminal displaying the image and operated by a user; and aggregate one or more areas of the image that attract interests of the user based on the browsing information.

19 Claims, 12 Drawing Sheets

(56) References Cited

U.S. PATENT DOCUMENTS

| | | |
|---|---|---|
| 2013/0246657 A1 | 9/2013 | Hyo |
| 2014/0207932 A1 | 7/2014 | Hyo |
| 2014/0258515 A1 | 9/2014 | Hyo |
| 2014/0337541 A1 | 11/2014 | Hyo |
| 2015/0039741 A1 | 2/2015 | Hyo |
| 2015/0256709 A1 | 9/2015 | Sugimura et al. |
| 2015/0286898 A1 | 10/2015 | Di et al. |
| 2016/0301816 A1 | 10/2016 | Hyo |
| 2017/0019541 A1 | 1/2017 | Hyo |
| 2017/0094119 A1 | 3/2017 | Fukasawa et al. |
| 2018/0075656 A1* | 3/2018 | Kim ............... G06F 3/0482 |
| 2018/0276722 A1* | 9/2018 | Fujita ............ G06F 3/04815 |
| 2020/0099854 A1* | 3/2020 | Kajiwara ........... H04N 23/50 |

FOREIGN PATENT DOCUMENTS

| | | |
|---|---|---|
| JP | 2008-186063 | 8/2008 |
| JP | 2009-059051 | 3/2009 |
| JP | 2009-113390 | 5/2009 |
| JP | 2010-206262 | 9/2010 |
| JP | 2011-081768 | 4/2011 |
| JP | 2012-213144 | 11/2012 |
| JP | 2013-117945 | 6/2013 |
| JP | 2013-196213 | 9/2013 |
| JP | 2013-225285 | 10/2013 |
| JP | 2013-251787 | 12/2013 |
| JP | 2014-127840 | 7/2014 |
| JP | 2014-160451 | 9/2014 |
| JP | 2015-046155 | 3/2015 |
| JP | 2015-062144 | 4/2015 |
| JP | 2015-092362 | 5/2015 |
| JP | 2015-097097 | 5/2015 |
| JP | 2015-181012 | 10/2015 |
| JP | 2015-195060 | 11/2015 |
| JP | 2016-006634 | 1/2016 |
| JP | 2017-027124 | 2/2017 |
| JP | 2017-027630 | 2/2017 |
| JP | 2017-134806 | 8/2017 |
| JP | 2017-173926 | 9/2017 |
| JP | 2018-133819 | 8/2018 |
| JP | 2018-156609 | 10/2018 |
| JP | 2018-160225 | 10/2018 |
| JP | 2018-160227 | 10/2018 |
| JP | 2018-196990 | 12/2018 |
| JP | 2018-200678 A | 12/2018 |
| JP | 2018-206431 | 12/2018 |

OTHER PUBLICATIONS

Office Action dated Dec. 23, 2022 in European Patent Application No. 20 212 242.0, 8 pages.

Office Action dated Aug. 29, 2023 in Japanese Patent Application No. 2019-229112, 3 pages.

* cited by examiner

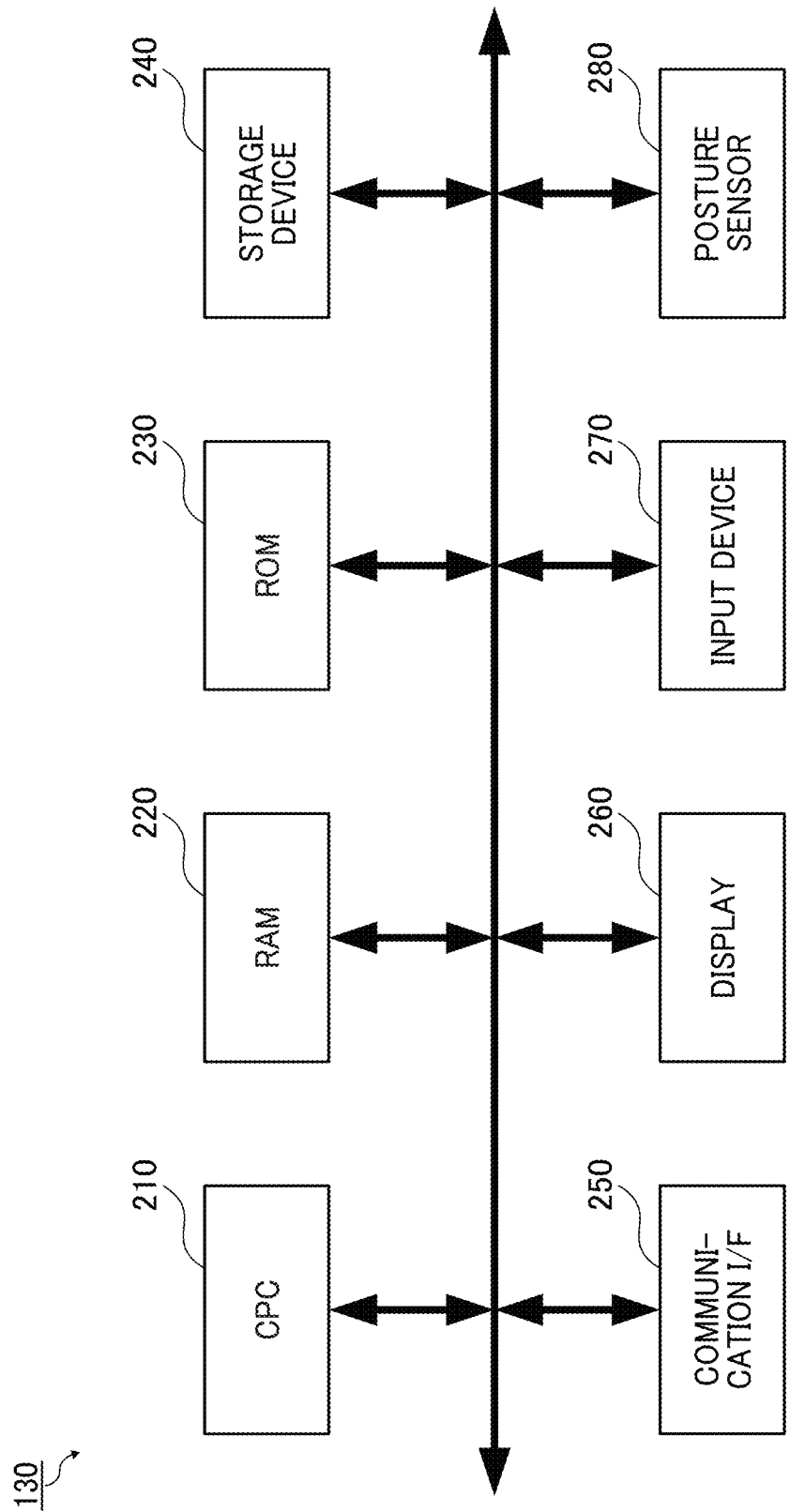

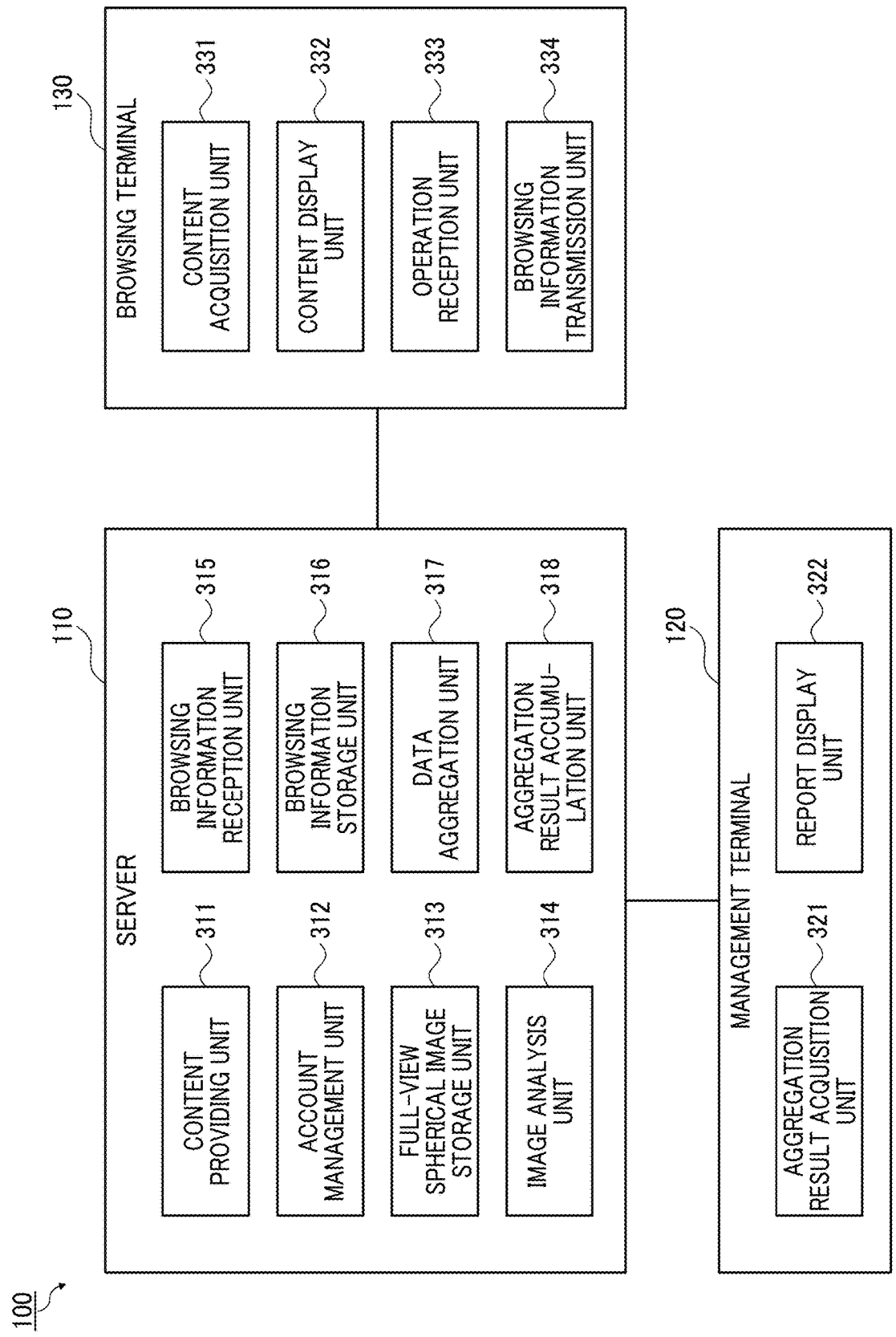

FIG. 4A

| ACCOUNT ID | ACCOUNT NAME | CONTENT ID | CONTENT NAME | IMAGE ID | IMAGE TITLE |
|---|---|---|---|---|---|
| BIZ0001 | REAL ESTATE AGENT A | A001 | CONDOMINIUM AAA | 1234 | LIVING ROOM |
| BIZ0001 | REAL ESTATE AGENT A | A001 | CONDOMINIUM AAA | 7890 | BED ROOM |
| BIZ0002 | HOUSING AGENT B | B001 | APARTMENT BBB | 5555 | ENTRANCE |
| BIZ0002 | HOUSING AGENT B | B001 | APARTMENT BBB | 6666 | KITCHEN |

FIG. 4B

| CONTENT ID | IMAGE ID | DATE | PV NUMBER |
|---|---|---|---|
| A001 | 1234 | 2019/12/1 | 839 |
| | 1234 | 2019/12/2 | 865 |
| | 1234 | 2019/12/3 | 901 |
| | 7890 | 2019/12/1 | 40 |
| | 7890 | 2019/12/2 | 57 |
| | 7890 | 2019/12/3 | 413 |

FIG. 4C

| CONTENT ID | IMAGE ID | TIME STAMP | LATITUDE | LONGITUDE | AUTO ROTATION | OPERATION START | ANGLE |
|---|---|---|---|---|---|---|---|
| A001 | 1234 | 2019/12/1 00:00:00 | 0.00 | 0.00 | TRUE | TRUE | 5.00 |
| | | 2019/12/1 00:00:01 | 1.00 | 2.00 | TRUE | FALSE | 5.00 |
| | | 2019/12/1 00:00:02 | 2.00 | 4.00 | TRUE | FALSE | 5.00 |
| | | 2019/12/1 00:00:03 | 3.00 | 6.00 | TRUE | FALSE | 5.00 |
| | | 2019/12/1 00:00:04 | 4.00 | 8.00 | TRUE | FALSE | 5.00 |
| | | 2019/12/1 00:00:05 | 5.00 | 10.00 | TRUE | TRUE | 5.00 |

FIG. 5

CONTENT OF REAL ESTATE PROPERTY

CONDOMINIUM AAA  3RD FLOOR  3LDK  $ XX MILLION

FLOOR PLAN

COMMON CORRIDOR
ROOM 1 (21 m²)
ROOM 2 (19 m²)
KITCHEN
BATH ROOM
ROOM 3 (17 m²)
LIVING ROOM (48 m²)
BALCONY
N

LIVING ROOM

IMAGE LIST

INQUIRE THIS PROPERTY

FIG. 6
(a) 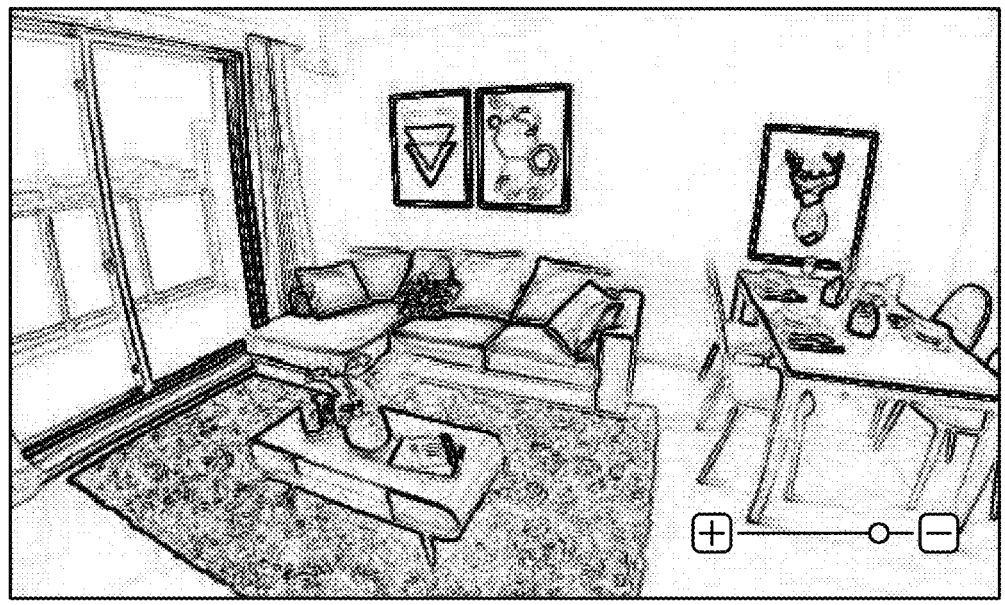
ENLARGE
(b) 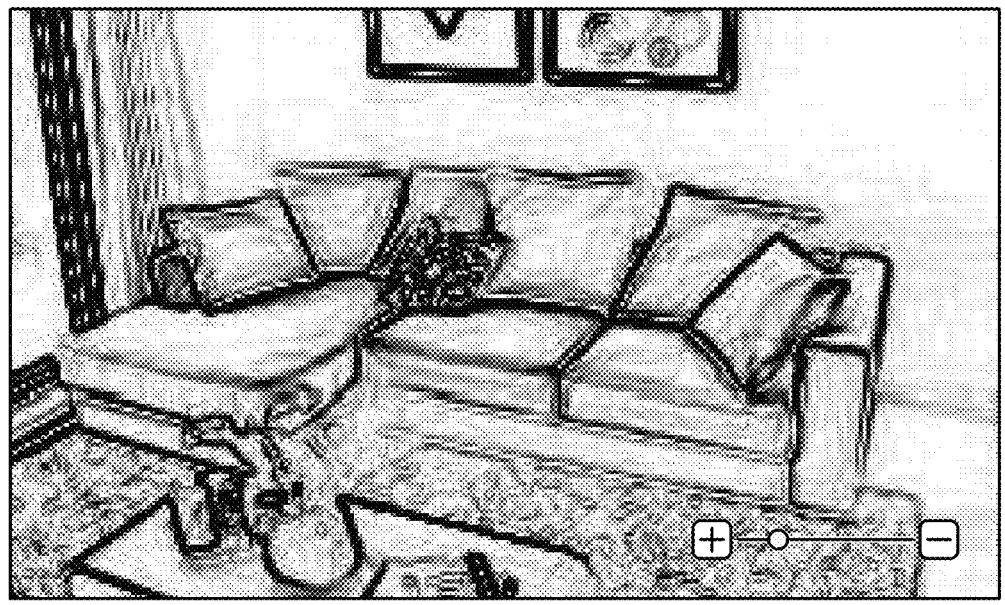

FIG. 8

REPORT SETTING

SELECT TIMING WHEN TO ACQUIRE REPORT

○ Every day

● Days of week: ○ Sun ● Mon ○ Tue ○ Wed ○ Thr ○ Fri ○ Sat

SELECT AGGREGATION PERIOD OF REPORT

○ PARTICULAR PERIOD DESIGNATION: 2019/4/1 ~ 2019/7/1

● REGULAR PERIOD DESIGNATION: ○ WEEKLY ● MONTHLY

SELECT HOW TO ACQUIRE REPORT

○ DOWNLOAD: SELECT FOLDER  C:\REPORT\

● MAIL TRANSMISSION:  report@aaa-example.com
INPUT TRANSMISSION DESTINATION

RUN

RETURN

INFORMATION PROCESSING SYSTEM, METHOD, AND STORAGE MEDIUM

CROSS-REFERENCE TO RELATED APPLICATION

This application claims priority pursuant to 35 U.S.C. § 119(a) to Japanese Patent Application No. 2019-229112, filed on Dec. 19, 2019 in the Japan Patent Office, the disclosure of which is incorporated by reference herein in its entirety.

BACKGROUND

Technical Field

This disclosure relates to an information processing system, a method, and a storage medium for aggregating content browsing information.

Background Art

Services introducing commercial products through displaying images are widely used in real estate businesses and electronic commerce businesses. In particular, wide-angle images, such as full-view spherical images, displayed in contents, can appeal to customers browsing the contents by providing more realistic effect than still images.

Further, technologies to obtain and record history information of browsing operation of images included in the contents performed by persons browsing have been developed. For example, a browsing system to record display state of images is devised. In this browsing system, advertisement that is more appealing to persons browsing can be displayed by displaying the advertisement based on the operation history information.

SUMMARY

As one aspect of the present disclosure, an information processing system includes a browsing information reception unit configured to acquire browsing information indicating a display state of an image from a browsing terminal displaying the image and operated by a user; and a data aggregation unit configured to aggregate one or more areas of the image that attract interests of the user based on the browsing information.

As another aspect of the present disclosure, a method includes acquiring browsing information indicating a display state of an image from a browsing terminal displaying the image and operated by a user; and aggregating one or more areas of the image that attract interests of the user based on the browsing information.

As to the above described aspects of the present disclosure, the information processing system, method, program, and storage medium or carrier means that summarizes or aggregates areas where browsing persons show there interests can be provided.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 2B is an example of a hardware block diagram of a browsing terminal;

FIG. 3 is an example of software block diagram of each apparatus configuring a system according to an embodiment;

FIGS. 4A, 4B, and 4C are examples of various tables according to an embodiment;

FIG. 5 is an example of screen displaying a content according to an embodiment;

FIG. 6 (6(a), 6(b)) is an example of an operation of changing a display style of image included in a content according to an embodiment;

FIG. 8 is an example of report setting screen according to an embodiment;

Figure 1:
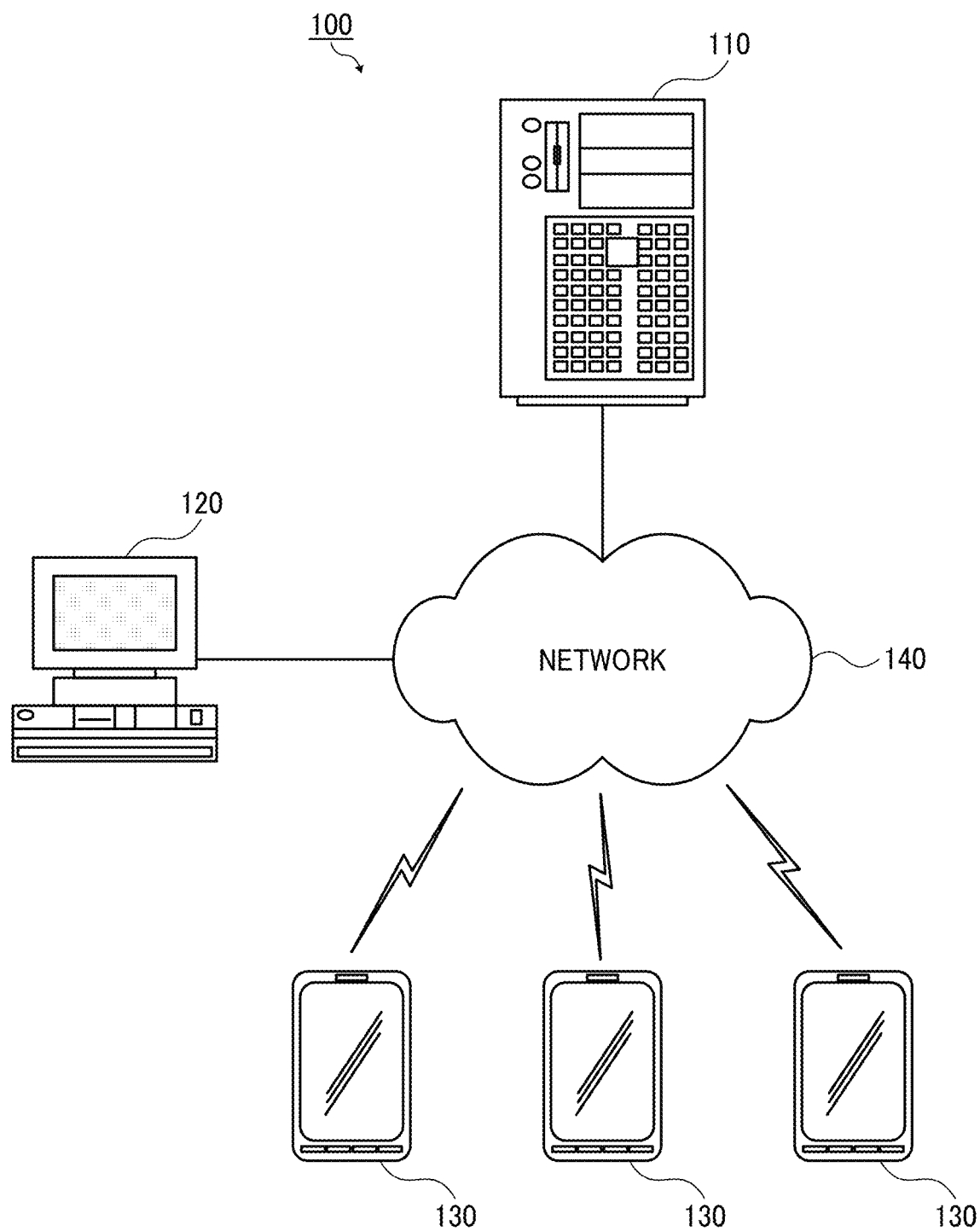
FIG. 1 is an example of hardware block diagram of a system according to an embodiment.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments with reference to the drawings, but the present invention is not limited to embodiment described in this description. In each of the following drawings, the same reference numerals are used for the same reference elements, and the description thereof may be omitted.

In the embodiment described below, a description is given of contents used for providing a service introducing real estate properties as one example, but is not limited thereto, and any contents can be used. Further, in this description, full-view spherical images are described as an example of image included in the content, but is not limited thereto. The image included in the contents can be any wide-angle image other that full-view spherical image, such as panoramic image, fish-eye image, or the like, and can be any still image or movie image.

FIG. 1 is an example of hardware block diagram of a system 100 according to the embodiment. In an example case of FIG. 1, the system 100 includes a server 110, a management terminal 120, and a plurality of browsing terminals 130 connectable via a network 140 as hardware resources environment.

The server 110 is an information processing apparatus that provides a service used for browsing content (hereinafter, referred to as content browsing service).

The management terminal 120 is, for example, an information processing apparatus, such as a personal computer. The management terminal 120 displays a result of summarizing or aggregating various situations, such as content creation and content browsing.

The browsing terminal 130 is, for example, an information processing apparatus, such as a smart phone. When the browsing terminal 130 displays the content, the displayed content can be browsed or viewed by a user. Further, the browsing terminal 130 is not limited to the smart phone, but can be any device, such as personal computer, digital signage, head-mounted display, or the like.

Further, the number of apparatuses or devices configuring the system 100 is not limited to the number illustrated in FIG. 1, but the number of apparatuses or devices configuring the system 100 can be any number. Further, the method of connecting each apparatus to the network 140 can be by wire and/or wirelessly.

Figure 2A:
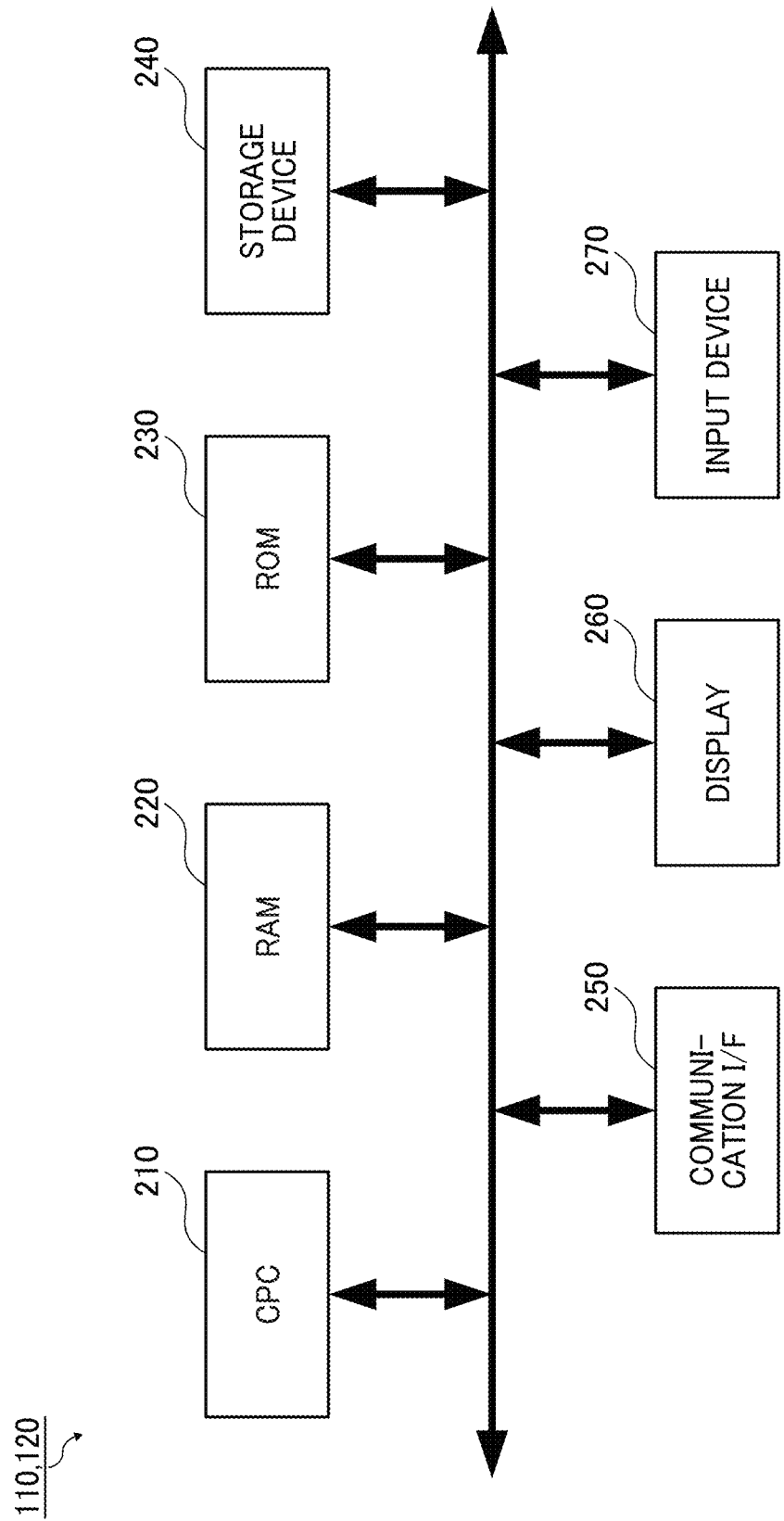
FIG. 2A is an example of a hardware block diagram of a server and a management terminal.

Hereinafter, with reference to FIG. 2, a description is given of a hardware configuration of each apparatus configuring the system 100. FIG. 2 is an example of a hardware block diagram of each of the apparatuses configuring the system 100. FIG. 2A is an example of a hardware block diagram of the server 110 and the management terminal 120. FIG. 2B is an example of a hardware block diagram of the browsing terminal 130.

Hereinafter, with reference to FIG. 2A, a description is given of the server 110 and the management terminal 120. As illustrated in FIG. 2A, each of the server 110 and the management terminal 120 includes, for example, a central processing unit (CPU) 210, a random access memory (RAM) 220, a read only memory (ROM) 230, a storage device 240, a communication interface (I/F) 250, a display 260, and an input device 270, in which hardware resources are connected via a bus.

The CPU 210 executes a program for controlling the operation of the server 110 and the management terminal 120 to perform given processing.

The RAM 220 is a volatile storage device providing an execution space of the program executed by the CPU 210, and is also used for storing and loading programs and data. The ROM 230 is a non-volatile storage device storing programs and firmware executed by the CPU 210.

The storage device 240 is a readable-writable non-volatile storage device that stores operating system (OS) and various applications, setting information, various data, or the like, with which the server 110 and the management terminal 120 can perform various functions. The storage device 240 employs, for example, hard disk drive (HDD), and solid state drive (SSD).

The communication I/F 250 connects the server 110 or the management terminal 120 to the network 140, enabling communication with other apparatus via the network 140. The communication over the network 140 may be by-wire communication or wireless communication, and may use a given communication protocol, such as transmission control protocol/internet protocol (TCP/IP), to send and receive various data.

The display 260 is an apparatus used for displaying various data and state of apparatus to a user. The display 260 is, for example, liquid crystal display (LCD). The input device 270 is a device used for operating the server 110 and the management terminal 120. The input device 270 can be a keyboard, a mouse, or the like. Further, the display 260 and the input device 270 may be configured as separate devices, or the display 260 and the input device 270 may be configured collectively as touch panel display. Further, the server 110 may be configured without the display 260 and/or the input device 270.

Hereinafter, with reference to FIG. 2B, a description is given of the browsing terminal 130. As illustrated in FIG. 2B, the browsing terminal 130 includes, for example, a CPU 210, a RAM 220, a ROM 230, a storage device 240, a communication I/F 250, a display 260, an input device 270, and a posture sensor 280, in which hardware resources are connected via a bus. Further, since the CPU 210, RAM 220, ROM 230, storage device 240, communication I/F 250, display 260, and input device 270 included in the browsing terminal 130 are the same as those illustrated in FIG. 2A, the details thereof are omitted.

The posture sensor 280 can be configured using, for example, an acceleration sensor, a gyro sensor, a geomagnetic sensor, or the like. The posture sensor 280 is a device used for measuring an inclination of the browsing terminal 130. Since the posture sensor 280 measures a posture of the browsing terminal 130, for example, when a browsing person changes the posture of the browsing terminal 130, the posture sensor 280 detects an inclination of the browsing terminal 130, and outputs measured posture data. The browsing terminal 130 can control a display range of image based on the posture data.

The hardware configuration included in each of the apparatuses configuring the system 100 has been described.

Hereinafter, with reference to FIG. 3, a description is given of functional units implemented by each hardware resource. FIG. 3 is an example of software block diagram of each apparatus configuring the system 100. Further, the functional units in FIG. 3 is described with reference to FIG. 4. FIGS. 4A, 4B, and 4C are examples of various tables according to the embodiment. Further, in FIGS. 4A, 4B, and 4C, data structure of table format is used, but the data structure is not particularly limited to the table format. The data structure can be any format other than the table format.

Hereinafter, with reference to FIG. 3, a description is given of the server 110. The server 110 includes various modules, such as content providing unit 311, account management unit 312, full-view spherical image storage unit 313, image analysis unit 314, browsing information reception unit 315, browsing information storage unit 316, data aggregation unit 317, and aggregation result accumulation unit 318.

The content providing unit 311 provides contents used for introducing and presenting information on real estate properties to the browsing terminal 130. The contents may be provided as web pages via a browser, or may be provided by applications.

The account management unit 312 manages an account of an administrator who provides the contents. For example, the account management unit 312 stores and manages the table illustrated in FIG. 4A in the storage device 240.

As illustrated in FIG. 4A, the table managed by the account management unit 312 stores various information, such as account identification or identifier (ID), account name, content ID, content name, image ID, and image title.

The account ID is a code uniquely identifying each account. In an example of FIG. 4A, the account ID is allocated with a sequence number starting from "BIZ0001".

The account name is a name of each account. In an example of FIG. 4A, a name of real estate agent that provides contents is stored as the account name.

The content ID is a code uniquely identifying each content. In an example of FIG. 4A, the content ID is allocated for each content provided by the real estate agent.

The content name is a name indicating each content. In an example of FIG. 4A, a name of property is stored as the content name.

The image ID is a code identifying each image included in the content, and the image title is a name of each image.

The content providing unit 311 provides the content to the browsing terminal 130 by referring to the account management unit 312.

The description is returned to FIG. 3. The full-view spherical image storage unit 313 stores image data of full-view spherical image included in the content to the storage device 240. The full-view spherical image storage unit 313 can store the image data in association with the image ID and/or image title.

The image analysis unit 314 analyzes the full-view spherical image included in each content. For example, the image analysis unit 314 performs an analysis based on feature amount to identify an object in the full-view spherical image or a structure of photographed space.

Further, the image analysis unit 314 can determine a name of identified object and space by applying machine learning technology. Specifically, the image analysis unit 314 analyzes the full-view spherical image obtained by photographing a room based on the feature amount to determine whether the object is, for example, television or sofa, and to determine whether a photographed space is a kitchen or living room.

The browsing information reception unit 315 controls the operation of the communication I/F 250 to receive browsing information from the browsing terminal 130.

The browsing information storage unit 316 stores the browsing information received by the browsing information reception unit 315 in the storage device 240.

Hereinafter, with reference to FIGS. 4B and 4C, a description is given of an example of tables that the browsing information storage unit 316 stores in the storage device 240.

FIG. 4B is an example of table storing the number of browsing of image included in content for each date (hereinafter, referred to as page view (PV) number). In an example of FIG. 4B, the PV number from Dec. 1, 2019 to Dec. 3, 2019 is stored for images "1234" and "7890" included in a content having a content ID of "A001". The PV number may not be stored by date as illustrated in FIG. 4B, but may be stored weekly or monthly.

Further, as illustrated in FIG. 4C, the browsing information storage unit 316 can store the browsing information with a time stamp in the table as history data. As illustrated in FIG. 4C, the history data is managed or stored for each image included in each content. The history data includes various information associated with each other using the table, such as the time stamp indicating a particular time when each image was browsed or viewed, coordinates (latitude, longitude) of the center position of full-view spherical image displayed at the particular time, information indicating whether automatic rotation mode is enabled (TRUE/FALSE), information indicating whether a start of image operation is issued (TRUE/FALSE), and angle (e.g., solid angle) indicating a display range of the displayed full-view spherical images.

In this description, the automatic rotation mode indicates a mode of displaying the image by rotating a displayed angle without an manual operation by the browsing person when the full-view spherical image is being displayed.

Further, the start of image operation indicates that the browsing person has started an operation of changing the display range to the full-view spherical image.

Further, the tables illustrated in FIGS. 4B and 4C are just examples, and the tables may include items other than those illustrated in FIGS. 4B and 4C.

The description is returned to FIG. 3. The data aggregation unit 317 refers to the respective tables stored in the browsing information storage unit 316 to aggregate the browsing information. The data aggregated by the data aggregation unit 317 is output to the aggregation result accumulation unit 318.

The aggregation result accumulation unit 318 accumulates the aggregation result output from the data aggregation unit 317 in the storage device 240. The aggregation result accumulated by the aggregation result accumulation unit 318 is distributed to an administrator of content, for example, in a form of report or the like.

Hereinafter, with reference to FIG. 3, a description is given of the management terminal 120. The management terminal 120 includes modules, such as aggregation result acquisition unit 321, and report display unit 322.

The aggregation result acquisition unit 321 controls an operation of the communication I/F 250 to acquire or obtain the aggregation result from the aggregation result accumulation unit 318 of the server 110.

The report display unit 322 controls an operation of the display 260 to display the aggregation result obtained by the aggregation result acquisition unit 321.

Hereinafter, with reference to FIG. 3, a description is given of the browsing terminal 130. The browsing terminal 130 includes modules, such as content acquisition unit 331, content display unit 332, operation reception unit 333, and browsing information transmission unit 334.

The content acquisition unit 331 controls an operation of the communication I/F 250 to acquire or obtain the content from the content providing unit 311 of the server 110.

The content display unit 332 controls an operation of the display 260 to display the content.

The operation reception unit 333 receives various operations performed using the browsing terminal 130 based on signals output from the input device 270 and the posture sensor 280.

In the embodiment described below, the operation reception unit 333 receives various operations for changing the display state of image, which are collectively referred to as "browsing operation." The browsing operation includes, for example, click, drag, drop, scroll, tap, swipe, pinch in/pinch out, and a change of posture of the browsing terminal 130 used for changing an angle of displaying image and for enlarging/reducing a size of image. When the operation reception unit 333 receives signals or data related to any browsing operation, the display range and size of full-view spherical image in the content can be changed.

The browsing information transmission unit 334 controls an operation of the communication I/F 250 to transmit data of various browsing operations received by the operation reception unit 333 to the server 110. The browsing information transmission unit 334 can transmit the data of browsing operations to the server 110 as the history data together with a particular time at which each operation was received. Further, the browsing information transmission unit 334 can transmit the contents and PV number of image to the server 110.

Further, the above described software block diagram corresponds to the functional units implemented by the CPU 210 by executing the program according to the embodiment. Further, the functional units described in each embodiment may be implemented as software, or a part or all of the functional units may be implemented as hardware that provides a similar function.

Further, the above described functional units may not be necessarily included in the configuration illustrated in FIG. 3. Thus, the above described functional units may be implemented using, for example, a cooperation between the server 110 and the management terminal 120.

Hereinafter, with reference to FIGS. 5 and 6, a description is given of example of content according to the embodiment. FIG. 5 is an example of screen displaying the content according to the embodiment. Further, FIG. 6 (6(a), 6(b)) is an example of an operation of changing a display style of image included in the content.

The content is, for example, content of real estate property as illustrated in FIG. 5, and the content displays, for example, name, location, price, floor plan, image list of property, and image of property.

As illustrated in FIG. 5, a numerical icon indicating each capturing position of full-view spherical image is superimposed on the floor plan. Further, the displayed content includes a full-view spherical image of interior and outer appearance of property. In an example case of FIG. 5, the content including a full-view spherical image captured in a living room is displayed. The displayed full-view spherical image can be selected from the numerical icon, and an image list displayed on the floor plan.

The numerical icon displayed on the floor plan is displayed by superimposing a fan-shaped icon indicating an angle of full-view spherical image being displayed, and the fan-shaped icon indicates a direction corresponding to the full-view spherical image being displayed (see icon 1 in FIG. 5).

Further, an angle of the full-view spherical image being displayed can be changed, and the full-view spherical image displayed can be enlarged and reduced by performing various browsing operations. For example, as illustrated in FIG. 6(a) and FIG. 6(b), the full-view spherical image can be displayed by enlarging the full-view spherical image.

FIG. 6(a) is an example of display state of full-view spherical image before the enlargement. When the full-view spherical image displayed under the display state of FIG. 6(a) is enlarged by performing various browsing operations by a browsing person, the full-view spherical image is displayed under a display state of FIG. 6(b). Further, a display style of the fan-shaped icon on the floor plan is also changed with a change of the display state caused by the browsing operation.

Figure 7:
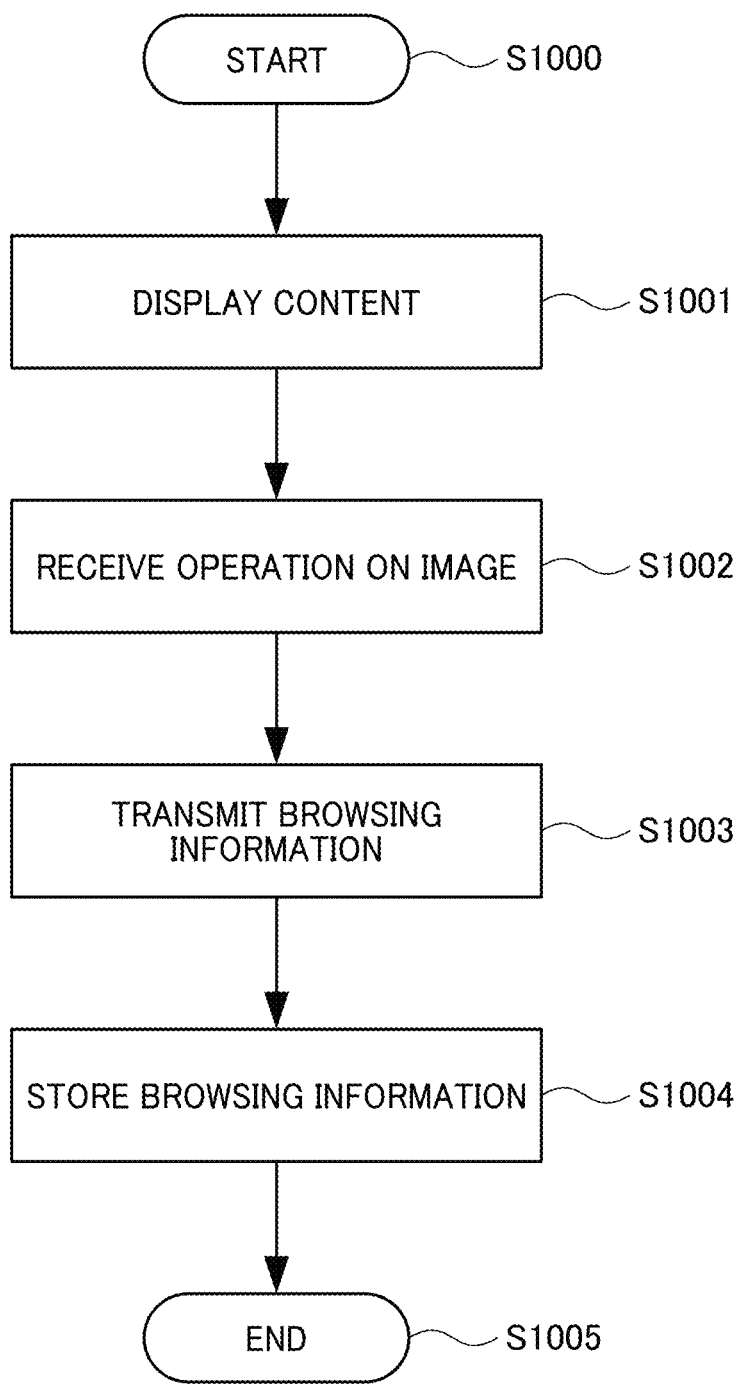
FIG. 7 is a flowchart illustrating processing of recording or storing browsing information according to an embodiment.

Hereinafter, with reference to FIG. 7, a description is given of a process of recording or storing the browsing information performed in the system 100. FIG. 7 is a flowchart illustrating processing of recording or storing the browsing information. The system 100 starts the sequence from step S1000.

In step S1001, the content display unit 332 of the browsing terminal 130 displays the content acquired by the content acquisition unit 331.

Then, in step S1002, the operation reception unit 333 receives various browsing operations performed by a user, such as a browsing person.

In step S1003, the browsing information transmission unit 334 transmits the browsing information to the server 110. The transmitted browsing information includes, for example, type of browsing operation, coordinates where the browsing operation was performed, display state (e.g., angle, enlargement/reduction) of full-view spherical image, time of browsing operation, date of browsing, and the number of browsing times. Further, the configuration of browsing information is not limited to the above information items, but may include various information items related to the browsing.

When the browsing information reception unit 315 of the server 110 receives the browsing information, in step S1004, the browsing information storage unit 316 stores the browsing information in the storage device 240.

Then, in step S1005, the system 100 terminates the sequence of FIG. 7.

The tables of FIGS. 4B and 4C can be recorded or stored by performing the sequence described in FIG. 7. Further, by aggregating the recorded or stored browsing information, an administrator can recognize one or more images and one or more objects attracting interests of the browsing persons, with which the administrator can recognize the needs of customers easily.

Hereinafter, with reference to FIG. 8, a description is given of settings used for acquiring or obtaining a report of aggregation result, which can be set by an administrator. FIG. 8 is an example of report setting screen according to the embodiment.

The administrator can set, for example, timing when to acquire or obtain report, an aggregation period of report, and a method of acquiring or obtaining report using the report setting screen of FIG. 8.

The timing when to acquire or obtain report can be set as the timing of requesting aggregation result, such as every day or specific designated day of the week. The aggregation period of report can be any period designated by the administrator, such as week and month. The method of acquiring or obtaining report can be selected from downloading a report from any folder or attaching a report in e-mail. Further, the configuration illustrated in FIG. 8 is one example, but other items can be set for setting the conditions.

Figure 9:
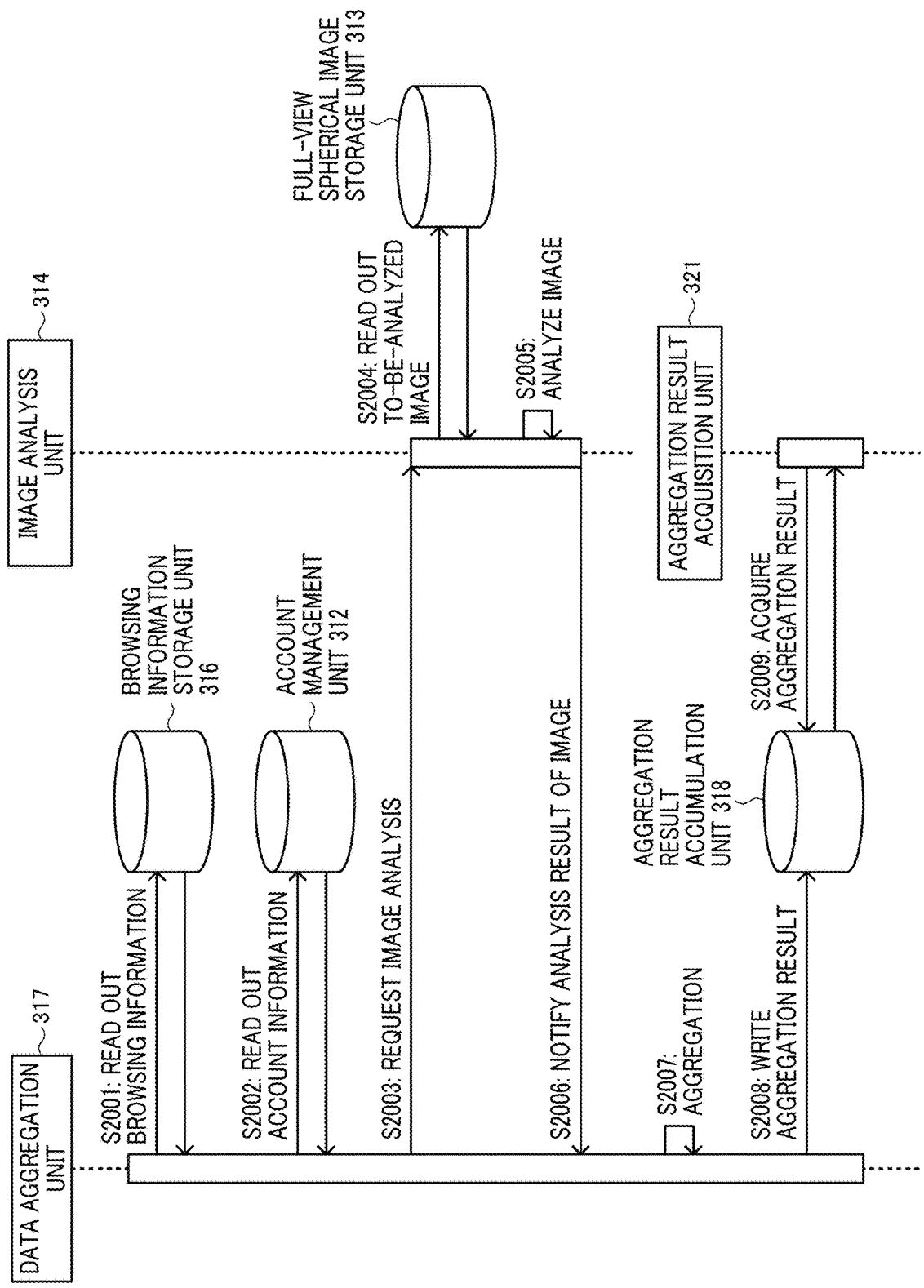
FIG. 9 is a sequence diagram illustrating aggregation processing according to an embodiment.

Hereinafter, with reference to FIG. 9, a description is given of aggregation processing performed by the system 100. FIG. 9 is a sequence diagram illustrating the aggregation processing according to the embodiment. The sequence illustrated in FIG. 9 may be started at the timing set on the report setting screen, or may be started in response to receiving a request from an administrator.

In step S2001, the data aggregation unit 317 of the server 110 reads out browsing information from the browsing information storage unit 316.

In step S2002, the data aggregation unit 317 reads out account information related to an administrator who has issued an aggregation request, from the account management unit 312.

Then, in step S2003, the data aggregation unit 317 issues an image analysis request to the image analysis unit 314. When requesting the image analysis, the data aggregation unit 317 notifies the account information obtained in step S2002 to the image analysis unit 314 in step S2003. Then, the image analysis unit 314 can identify an image to be analyzed.

When the image analysis unit 314 receives the image analysis request in step S2003, in step S2004, the image analysis unit 314 reads out an image to be analyzed from the full-view spherical image storage unit 313. The image to be analyzed is an image associated with the content managed by the administrator who has issued the aggregation request.

In step S2005, the image analysis unit 314 analyzes the image acquired from the full-view spherical image storage unit 313. Specifically, the image analysis unit 314 analyzes a structure of one or more objects and a space included in the image, for example, based on the feature amount of full-view spherical image. Further, the image analysis unit 314 can identify the one or more objects based on analysis results of the past, and/or a name each of the identified one or more object and space based on analysis results of the past.

After analyzing the image in step S2005, in step S2006, the image analysis unit 314 notifies an analysis result of image to the data aggregation unit 317.

In response to receiving the image analysis result, in step S2007, the data aggregation unit 317 performs data aggregation based on the browsing information and the image analysis result. Specifically, when aggregating the data based on the browsing information, the data aggregation unit 317 aggregates various data that were acquired during the aggregation period set on the report setting screen, such as browsing frequency of content, the number of times of browsing each image included in the content, the number of times the browsing operation was performed, the browsing time, area that have attracted interests of browsing person in each image. Further, when aggregating the data based on the image analysis result, the one or more objects included in the area attracting the interests of browsing person in each image is aggregated.

After aggregating the data, in step S2008, the data aggregation unit 317 writes or stores an aggregation result to the aggregation result accumulation unit 318. If the data aggregation unit 317 aggregates the data and accumulates the aggregation results periodically, the processing load at the time of creating a report can be reduced.

Then, in step S2009, the aggregation result acquisition unit 321 of the management terminal 120 acquires the aggregation result from the aggregation result accumulation unit 318. The aggregation result may be acquired or obtained at any timing, or may be acquired or obtained at the timing set on the report setting screen.

The acquired aggregation result is displayed on the display 260 via the report display unit 322, with which the administrator can check and recognize the aggregation result.

Figure 10:
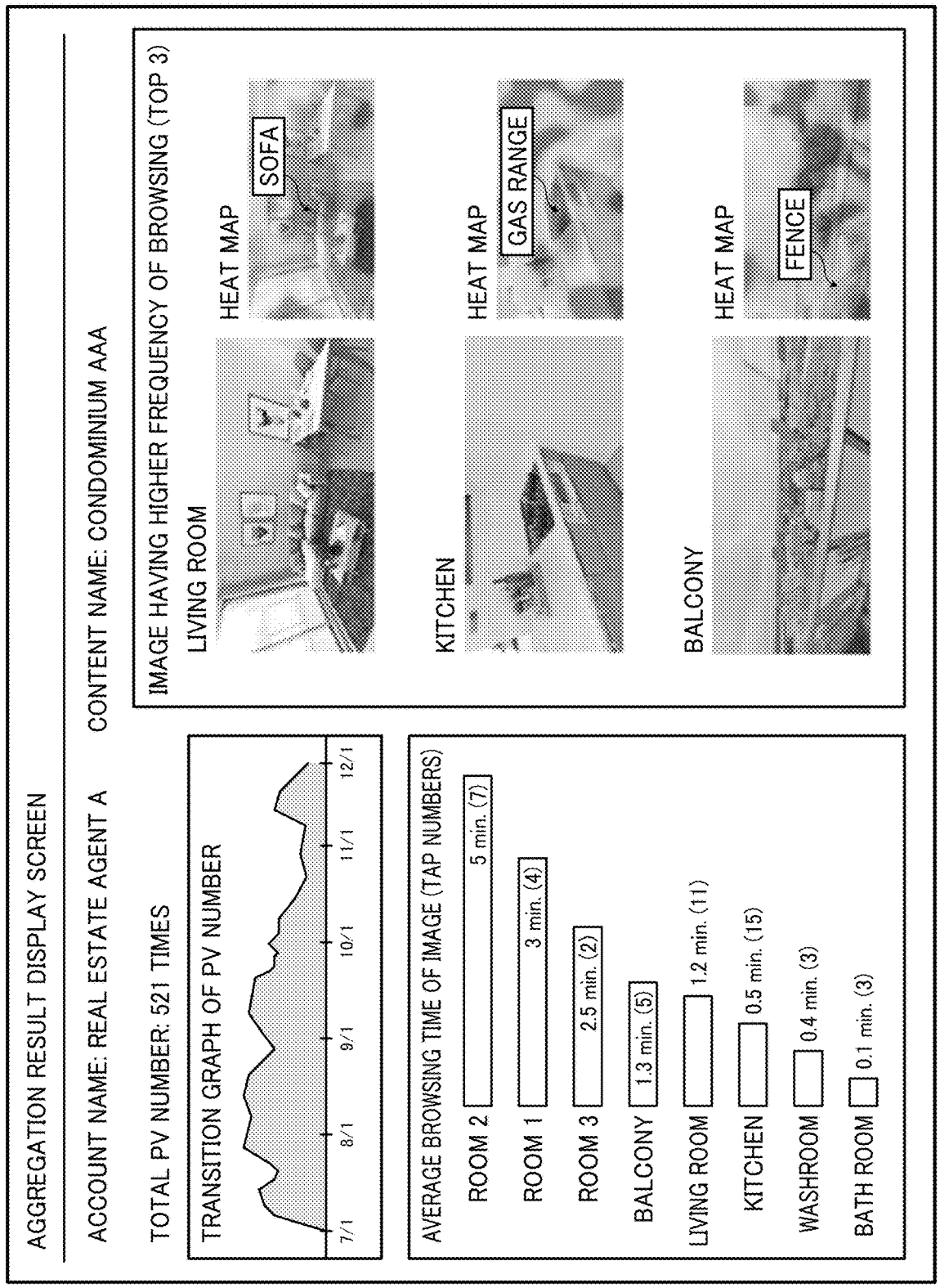
FIG. 10 is an example of aggregation result displayed at a management terminal according to an embodiment.

FIG. 10 is an example of aggregation result displayed at the management terminal 120. As illustrated in FIG. 10, an aggregation result display screen displays, for example, account name of administrator, content name of aggregation target, number of PVs of content, graph indicating a transition of number of PVs, average browsing time (e.g., minutes) of images included in the content, the number of times of performing browsing operation (e.g., tapping), and images browsed with higher frequency.

Further, as illustrated in FIG. 10, when displaying the images that have been browsed with higher frequency, a heat map indicating one or more areas attracting attention or interests of the browsing person with higher frequency (e.g., attention can be calculated based on the browsing operation performed by users) can be superimposed on each image. With this configuration, the administrator can visually recognize a portion where the browsing persons (e.g., customers) show the interests, and can recognize the needs of customers easily.

Further, by superimposing and displaying the name of the object identified by the image analysis results as illustrated in FIG. 10, the administrator can recognize the needs of customers more efficiently.

Further, the aggregation result display screen illustrated in FIG. 10 is just one example. The items displayed on the aggregation result display screen are not particularly limited, but various items can be displayed.

The above described embodiment can provide the information processing system, method, program, and storage medium or carrier means that summarizes or aggregates areas where browsing persons show their interests.

The above described embodiment can provide an information processing system, a method, a program, and carrier means or storage medium, which can aggregate or summarize one or more areas where the browsing person shows interests to the content.

The functional units according to the embodiment of this disclosure can be implemented by executable programs described in C, C++, C#, Java (registered trademark), or the like, and the programs according to the embodiment can be stored in hard disk, device-readable storage medium, such as compact disc (CD)-ROM, compact disc re-writable (CD-RW), magneto-optical (MO) disc, digital versatile disc (DVD), flexible disk, erasable programmable read-only memory electrically erasable programmable read-only memory (EEPROM: registered trademark), and erasable programmable read-only memory (EPROM), and can be transmitted through a network in a format that can be used executed at other devices.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier means or medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside the apparatus as long as the HDD is accessible. In this example, the CPU, such as a cashe memory of the CPU, and the RANI may function as a physical memory or a primary memory of the apparatus, while the HDD may function as a secondary memory of the apparatus.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An information processing system comprising:
   a processor; and
   circuitry configured to
      provide content including at least an image to a browsing terminal for displaying;
      acquire browsing information of the content including the at least an image from the browsing terminal displaying the content and operated by a user;
      store the browsing information as data in a table, the data including a time stamp indicating a particular time when each of the at least an image was browsed and browsing frequency of each of the at least an image included in the content; and
      aggregate the data in the table based on the browsing information,
   wherein the at least an image includes a floor-plan of the content, which is a content of a real estate property, on which a numerical icon indicating each capturing position of a full-view spherical image of a portion of the real estate property being displayed is superimposed,
   the circuitry further analyzes the full-view spherical image to obtain an analysis result, and aggregates the browsing information and the analysis result by associating the browsing information and the analysis result to obtain an aggregation result, and
   the analyzing the full-view spherical image includes analyzing a structure of one or more objects and an area included in the full-view spherical image and identifying the one or more objects and the area in the full-view spherical image based on feature amount of the full-view spherical image, and determining names of the identified one or more objects or area by machine learning, and
   the aggregating the analysis result includes aggregating the one or more objects included in the area attracting interest of the user in one of the at least an image.

2. The information processing system according to claim 1, further comprising a display to display the aggregation result including an image having the highest browsing frequency by the user among the at least an image and average browsing time of each of the at least an image.

3. The information processing system according to claim 1,
   wherein the browsing information includes information indicating a posture of the browsing terminal at a time when the user browses the image using the browsing terminal.

4. The information processing system according to claim 1,
   wherein the image is a wide-angle image.

5. A method comprising:
   providing content including at least an image to a browsing terminal for displaying;
   acquiring browsing information of the content including the at least an image from the browsing terminal displaying the content and operated by a user;
   storing the browsing information as data in a table, the data including a time stamp indicating a particular time when each of the at least an image was browsed and browsing frequency of each of the at least an image included in the content;
   aggregating the data in the table based on the browsing information, and
   analyzing the image to obtain an analysis result, and aggregating the browsing information and the analysis result by associating the browsing information and the analysis result to obtain an aggregation result,
   wherein the at least an image includes a floor-plan of the content, which is a content of a real estate property, on which a numerical icon indicating each capturing position of a full-view spherical image of a portion of the real estate property being displayed is superimposed,
   the analyzing the image to obtain the analysis results includes analyzing the full-view spherical image, which includes analyzing a structure of one or more objects and an area included in the full-view spherical image and identifying the one or more objects and the area in the full-view spherical image based on feature amount of the full-view spherical image, and determining names of the identified one or more objects or area by machine learning, and
   the aggregating the analysis result includes aggregating the one or more objects included in the area attracting interest of the user in one of the at least an image.

6. A non-transitory computer readable storage medium storing one or more instructions that, when performed by one or more processors, causes the one or more processors to execute a method, the method comprising:
   providing content including at least an image to a browsing terminal for displaying;
   acquiring browsing information of the content including the at least an image from the browsing terminal displaying the content and operated by a user;
   storing the browsing information as data in a table, the data including a time stamp indicating a particular time when each of the at least an image was browsed and browsing frequency of each of the at least an image included in the content;
   aggregating the data in the table based on the browsing information, and analyzing the image to obtain an analysis result, and aggregating the browsing information and the analysis result by associating the browsing information and the analysis result to obtain an aggregation result, wherein the at least an image includes a floor-plan of the content, which is a content of a real estate property, on which a numerical icon indicating each capturing position of a full-view spherical image of a portion of the real estate property being displayed is superimposed, the analyzing the image to obtain the analysis results includes analyzing the full-view spherical image, which includes analyzing a structure of one or more objects and an area included in the full-view spherical image and identifying the one or more objects and the area in the full-view spherical image based on feature amount of the full-view spherical image, and determining names of the identified one or more objects or area by machine learning, and the aggregating the analysis result includes aggregating the one or more objects included in the area attracting interest of the user in one of the at least an image.

7. The information processing system of claim 1, wherein the content further includes name, location, price, an image list of the real estate property indicating different portions of the real estate property, and an image of the real estate property.

8. The information processing system of claim 7, wherein the content includes the full-view spherical image of interior and/or outer appearance of the real estate property on which a name of an object in the real estate property is superimposed.

9. The information processing system according to claim 1, further comprising a display to display the aggregation result, wherein the circuitry controls the display to display a screen including a graph for each information indicating a name of an object or space photographed in the at least an image, the graph being generated based on browsing time included in the browsing information.

10. The information processing system according to claim 9, wherein the circuitry controls the display to display, on the screen including the graph, the number of browsing of the object or space photographed in the at least an image.

11. The information processing system according to claim 9, wherein the circuitry controls the number of page view for each real estate property and controls the display to display the number of page view for each real estate property.

12. The method according to claim 5, further comprising displaying the aggregation result by a display, wherein the display displays a screen including a graph for each information indicating a name of an object or space photographed in the at least an image, the graph being generated based on browsing time included in the browsing information.

13. The method according to claim 12, wherein the display displays, on the screen including the graph, the number of browsing of the object or space photographed in the at least an image.

14. The method according to claim 12, wherein the display displays the number of page view for each real estate property.

15. The non-transitory computer readable storage medium according to claim 6, wherein the method further comprises displaying the aggregation result by a display, wherein the display displays a screen including a graph for each information indicating a name of an object or space photographed in the at least an image, the graph being generated based on browsing time included in the browsing information.

16. The non-transitory computer readable storage medium according to claim 15, wherein the display displays, on the screen including the graph, the number of browsing of the object or space photographed in the at least an image.

17. The non-transitory computer readable storage medium according to claim 15, wherein the display displays the number of page view for each real estate property.

18. The information processing system according to claim 1, wherein the at least an image further includes a list of images each of which is given a numerical icon corresponding to the numerical icon indicating each capturing position superimposed on the floor plan, and the information processing system further comprises a display to display the full-view spherical image of the portion of the real estate property corresponding to the numerical icon on the floor plan or the image selected from the list of images.

19. The method according to claim 5, wherein the at least an image further includes a list of images each of which is given a numerical icon corresponding to the numerical icon indicating each capturing position superimposed on the floor plan, and the information processing system further comprises a display to display the full-view spherical image of the portion of the real estate property corresponding to the numerical icon on the floor plan or the image selected from the list of images.

* * * * *